United States Patent [19]
Fey et al.

[11] Patent Number: 5,431,568
[45] Date of Patent: Jul. 11, 1995

[54] RADAR TARGET GENERATOR

[75] Inventors: Warren T. Fey; Philip A. Hicks, both of San Diego, Calif.

[73] Assignee: McDonnell Douglas Corporation, Huntington Beach, Calif.

[21] Appl. No.: 80,904

[22] Filed: Jun. 21, 1993

[51] Int. Cl.⁶ .............................................. G01S 7/40
[52] U.S. Cl. ...................................... 434/2; 342/169; 342/172; 342/174
[58] Field of Search ................. 342/13, 169, 170, 171, 342/187, 172, 174; 434/2

[56] References Cited

U.S. PATENT DOCUMENTS

| | | | |
|---|---|---|---|
| 4,666,407 | 5/1987 | Jones | 342/169 X |
| 5,010,342 | 4/1991 | Jones, Jr. | 342/169 |
| 5,133,663 | 7/1992 | Willingham et al. | 434/2 |
| 5,134,412 | 7/1992 | Baseghi et al. | 342/169 |

*Primary Examiner*—John B. Sotomayor
*Attorney, Agent, or Firm*—Donald E. Stout; John P. Scholl; Roger C. Turner

[57] ABSTRACT

A radar target generator is disclosed which is not merely a simulator, generating video information for viewing by an operator, but is designed to be used in conjunction with an operating radar system, actually producing high fidelity radar targets, rather than targets that merely look like radar targets. Thus, it may be used for training of radar operators, as well as for calibrating, maintaining, and evaluating multiple types of radar systems. The system includes a first tap for sampling a portion of the radar signal traveling through a transmission line and redirecting that sample into the radar target generator. There, a central processor applies a target signature component to the sampled radar signal portion, following which a second tap returns the modified radar signal portion to a return radar signal traveling thorough a second transmission line.

9 Claims, 1 Drawing Sheet

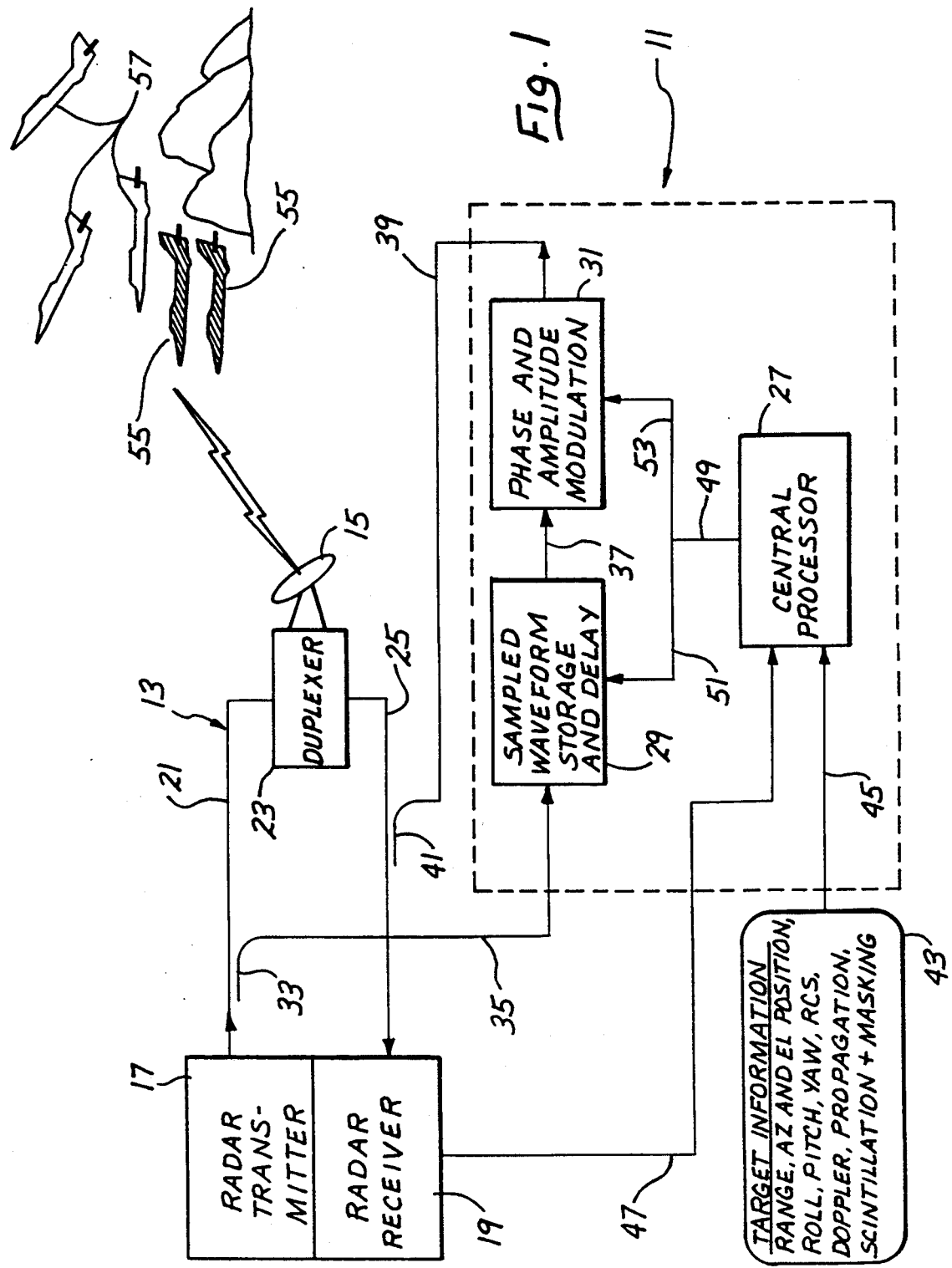

RADAR TARGET GENERATOR

BACKGROUND OF THE INVENTION

This invention relates to radar systems, and more particularly to a radar target generator system which is capable of generating synthesized targets which are observed by a radar system in the same manner as genuine targets.

Radar system simulators and trainers are often designed only to generate video information for viewing by an operator. This has many disadvantages because of the lack of realism in such a system. Additionally, it is very difficult to test actual radar systems, or to calibrate them, because of the inability to actually operate them in a realistic environment wherein the exact location and configuration of the targets is known.

What is needed, therefore, is a system which permits testing or calibration of a radar system, or the training of radar operators under simulated conditions, without the lack of realism attendant with video-based systems, and with assurance that the targets being observed are precisely known in terms of configuration and position, so that the accuracy of the system may be certified with confidence.

SUMMARY OF THE INVENTION

The present invention solves the problem outlined above by providing a radar target generator useful as both a training tool for radar operators and to support the calibration, maintenance, and evaluation of radar systems in general.

The inventive system generates RF output over a wide range of the radar spectrum, providing target signature having the amplitude, range-delay, clutter, scintillation (including multipath effects), and Doppler effects that would be expected of returns from real targets. The RF output from the radar target generator cannot be distinguished from actual target returns. This capability is achieved by generating signatures containing coherent target phase and amplitude related to radar cross section, antenna beam pattern, and target attitude, position, and velocity. The resulting target signature is applied to the radar receiver RF input.

Radar target generator databases contain attitude sensitive radar cross section by aircraft type, antenna patterns for the specific radar (receive and transmit), terrain maps, and other relevant information. Sufficient information is applied to the signatures to produce very realistic synthetic radar targets. In addition, detailed target signatures containing Doppler from the effects of rotor rotation, jet engine vortex, or missile exhaust represent additional possible applications for the invention.

The above mentioned and other objects and features of this invention and the manner of attaining them will become apparent, and the invention itself will be best understood, by reference to the following description taken in conjunction with the accompanying illustrative drawing.

BRIEF DESCRIPTION OF THE DRAWING

The FIGURE is a schematic view of a representative embodiment of the disclosed radar target generator.

DETAILED DESCRIPTION OF THE PREFERRED EMBODIMENT

Referring now to the FIGURE, a representative radar target generator system 11 is illustrated. The system 11 works in concert with a host radar system 13. The host radar system 13 comprises an antenna dish 15, a radar transmitter 17, and a radar receiver 19. The radar transmitter RF output line 21 conveys the radar RF signal from the transmitter 17 through a duplexer 23, from whence it is transmitted by the antenna 15. The antenna 15 simultaneously receives incoming radar return RF signals, which are directed by the duplexer 23 through the return line 25 and into the radar receiver 19, which processes the return signals for display to the radar operator, or for providing input to a controller or the like.

The radar target generator system 11 comprises a central processor unit 27, a sampled waveform storage and delay component 29, and a phase and amplitude modulator 31. An RF output tap 33 on line 21 samples a small amount of RF energy from the transmit signal in line 21 and sends it along line 35 into the sampled waveform storage and delay component 29. Line 37 feeds the output from component 29 into the phase and amplitude modulator 31, from which the sampled signal exits via line 39 and is re-introduced into the RF return line 25 by means of a tap 41.

In operation, the radar system 13 is turned on and may be radiating, as shown in the FIGURE, or merely feeding a dummy load instead of an antenna. As the RF signal from the radar transmitter 17 is conducted along the line 21, the tap 33 samples a small amount of RF energy from the signal, which travels through the line 35 into the sampled waveform storage and delay component 29. A specific synthesized target type is selected by the operator, depending upon the purpose of the operation being conducted. Based upon this selection, pertinent target information is relayed from a database 43 to the central processor 27, through line 45. This target information includes the configurational dimensions of the selected target, the range of the target from the antenna, azimuth, elevation, roll, pitch, yaw, RCS, Doppler, propagation, scintillation, and masking of the target. The central processor 27 also receives radar information from the radar receiver 19 through a line 47, consisting of transmit synchronization and status information, as well as antenna beam steering information, so that it can conform the synthesized target signal to the actual reflected radar signal. The processor 27 processes the received information from both lines 45 and 47, and transmits appropriate signals into both of the components 29 and 31, so that the RF sample is modified with the proper amount of range-delay, pulse shaping, attenuation, scintillation, and Doppler effects to synthesize a realistic RF return for a specific target type.

One of the unique aspects of the radar target generator is that it generates each false target by injecting into the radar receivers a sample of the radar transmit signal which has been delayed and phase and amplitude modulated by components 29 and 31. The delay provides range and the phase and amplitude modulation provide the effects of antenna beam steering and target RCS versus attitude, doppler, propagation effects, scintillation and masking in order to generate an accurate replica of a real target. Any suitable means may be used to provide the delay and modulation functions. The number of targets and their position in space is limited only by the complexity of the system.

Once the signal has been suitably modified, the radar target generator injects the synthesized RF radar targets into the radar system 13 between the antenna 15 and the receiver 19, by means of the tap 41, as if they were radar returns from real targets. As a result, the synthesized targets are based upon the radar system's output pulse shape duration, amplitude and phase, pulse repetition frequency (PRF), and carrier frequency.

The radar target generator does not interfere with any performance aspect of the host radar system being stimulated, including the observation of real airborne targets. For example, as shown in the FIGURE, both real targets 55 and synthesized targets 57 may be simultaneously observed by the radar receiver 19. What the system does accomplish is the provision of realistic, calibrated, synthetic radar targets to evaluate a radar system's overall performance and operator response.

The advantages of the disclosed system are numerous, and include its convenience as a radar operator training tool, and its ability to support the calibration, maintenance, and evaluation of multiple types of radar systems in general. With additional enhancements, potential applications include the training of combat, control, and information teams, stimulating radar systems that perform radar signature analysis, supporting the development of low observable weapon systems, and facilitating the development of radar evasion tactics. The radar target generators may also be networked with other radar target generators, if desired, so that a single synthesized target may be observed by more than one radar unit.

Although an exemplary embodiment of the invention has been shown and described, many changes, modifications, and substitutions may be made by one having ordinary skill in the art without departing from the spirit and scope of the invention. Therefore, the invention is not to be limited except by the scope of the appended claims.

What is claimed is:

1. A radar target generator for use with a radar system which comprises a radar transmitter, a load, a radar receiver, a first transmission line connecting said transmitter and said load, and a second transmission line connecting said load and said receiver, the radar target generator comprising:

a central processor;

a first tap for sampling a portion of a radar signal traveling through said first transmission line between the transmitter and the load and redirecting said sampling portion into the radar target generator, said central processor applying a target signature component to the sampled radar signal portion;

and a first tap for returning the modified radar signal portion to a return radar signal traveling through the second transmission line between the load and the radar receiver.

2. The radar target generator as recited in claim 1, wherein said load comprises an antenna.

3. The radar target generator as recited in claim 1, wherein said radar target generator does not interfere with any performance aspect of the radar system being stimulated, including the observation of real targets, such that both real and simulated targets may be observed simultaneously.

4. The radar target generator as recited in claim 1, and further comprising:

a sampled waveform storage and delay component;

a phase and amplitude modulator;

a data transmission line from said radar receiver and said central processor for transmitting synchronization and status information and antenna beam steering information, so that the central processor may conform the synthesized target signal to the actual reflected radar signal, and a database.

5. The radar target generator as recited in claim 4, wherein said first tap is adapted to redirect said sampling portion sequentially through said sampled waveform storage and delay component and said phase and amplitude modulator, said central processor applying said target signature component to the sampled radar signal portion in both the sampled waveform storage and delay component and the phase and amplitude modulator.

6. The radar target generator as recited in claim 5, wherein the target signature component is based upon a selected specific synthesized target type, and includes data generated from said database related to configurational dimensions of the selected target, the range of the target from the radar system, azimuth, elevation, roll, pitch, and yaw.

7. The radar target generator as recited in claim 5, wherein said sampled waveform storage and delay component and said phase and amplitude modulator function to delay and phase and amplitude modulate said modified radar signal portion to thereby provide effects of antenna beam steering, target RCS versus attitude, doppler, propagation effects, scintillation and masking in order to generate a more accurate replica of a real target.

8. The radar target generator as recited in claim 5, wherein the modified radar signal portion returned by said second tap is based upon the radar system's output pulse shape duration, amplitude and phase, pulse repetition frequency, and carrier frequency.

9. The radar target generator as recited in claim 1, wherein said radar target generator is adapted to be networked with other radar target generators so that a single synthesized target may be observed by more than one radar unit.

* * * * *